United States Patent
Wong et al.

(10) Patent No.: US 12,440,394 B2
(45) Date of Patent: Oct. 14, 2025

(54) DOUBLE-SIDED DIRECTIONAL WEIGHTED AND QUANTIFIED WET STATE SENSOR AND RELATED PRODUCTS AND METHODS

(71) Applicants: Shenzhen Ediaper Technology Limited, Shenzhen (CN); Sanwa Corporation, Tokyo (JP)

(72) Inventors: Sun Hoi Wong, Hong Kong (CN); Zhen Chen, Hong Kong (CN); Fei Xu, Hong Kong (CN)

( * ) Notice: Subject to any disclaimer, the term of this patent is extended or adjusted under 35 U.S.C. 154(b) by 750 days.

(21) Appl. No.: 17/770,278

(22) PCT Filed: Oct. 20, 2020

(86) PCT No.: PCT/CN2020/122250
§ 371 (c)(1),
(2) Date: Apr. 19, 2022

(87) PCT Pub. No.: WO2021/078124
PCT Pub. Date: Apr. 29, 2021

(65) Prior Publication Data
US 2022/0287888 A1      Sep. 15, 2022

(30) Foreign Application Priority Data

Oct. 20, 2019  (HK) ................................. 19131232.1
Nov. 4, 2019   (HK) ................................. 19131837.7

(51) Int. Cl.
*G01N 27/22*      (2006.01)
*A61F 13/15*      (2006.01)
(Continued)

(52) U.S. Cl.
CPC ........ *A61F 13/42* (2013.01); *A61F 13/15739* (2013.01); *A61F 2013/5307* (2013.01)

(58) Field of Classification Search
CPC ................ A61F 13/42; A61F 13/15739; A61F 2013/5307; A61F 13/15577;
(Continued)

(56) References Cited

U.S. PATENT DOCUMENTS 5,845,644 A * 12/1998 Hughes ................. A61F 5/48
                                                128/885
2019/0154607 A1* 5/2019 Tuli ..................... G01N 27/07
2019/0240080 A1* 8/2019 Tuli ................. A61F 13/15804

* cited by examiner

*Primary Examiner* — Nicholas J. Weiss
*Assistant Examiner* — Brandon W. Levy
(74) *Attorney, Agent, or Firm* — Novoclaims Patent Services LLC; Mei Lin Wong

(57) ABSTRACT

A sensor for realizing double-sided directional weighted and quantified wet state detection is disclosed, it includes a sensing strip, the sensing strip includes an upper sensing surface and a lower sensing surface, which can respectively realize a quantitative wet state detection on the upper and lower surfaces, the wet state of the upper and lower sides can be weighted and output according to a preset specific gravity, thereby providing a weighted and quantified wet state information related to a specific layer and a specific direction of a specific detection object. A manufacturing method for producing the sensor for realizing double-sided directional weighted and quantified wet state detection, a disposable smart absorbent article that can provide double-sided directional weighted and quantified wet state information, and a manufacturing method of a disposable smart absorbent article that can provide double-sided directional weighted and quantified wet state information are also disclosed.

7 Claims, 8 Drawing Sheets

(51) Int. Cl.
*A61F 13/42* (2006.01)
*A61F 13/53* (2006.01)

(58) Field of Classification Search
CPC .......... A61F 13/15723; A61F 13/15804; A61F 2013/424; A61B 5/205; A61B 5/208; A61L 15/56
See application file for complete search history.

DOUBLE-SIDED DIRECTIONAL WEIGHTED AND QUANTIFIED WET STATE SENSOR AND RELATED PRODUCTS AND METHODS

CROSS-REFERENCE TO RELATED APPLICATIONS

This application claims the priority of the Hong Kong patent application filed on Oct. 21, 2019 with the Hong Kong Patents Registry with application number 19131232.1 and the invention titled "Dual-sided Directional Weighted Wet State Sensor, Related Absorbent Article and Related System", and the priority of the Hong Kong patent application filed on Nov. 4, 2019 with the Hong Kong Patents Registry with application number 19131837.7 and the invention titled "An Excrement Sensor Capable of Distinguishing Feces and Urine, and Related Absorbent Article and System Device", the entire contents of the above are incorporated herein by reference.

TECHNICAL FIELD

The invention relates to a sensor, in particular to a sensor for realizing double-sided directional weighted and quantified wet state detection and the related products and methods.

RELATED ART

Disposable absorbent articles include diapers, insertion pads, pull-up pants, training pants, sanitary napkins, maternity napkins, and other sanitary products. For the convenience of description, diapers will be used as an example for description below, the relevant contents also apply to other disposable absorbent articles. Diapers usually include a top layer, an absorbent layer and a leak-proof layer, and its water absorption performance is mainly reflected in the absorbent layer. When urination occurs, the urine will pass through the top layer into the absorbent layer, and the polymer material in the absorbent layer will absorb the moisture in the urine and lock it up, so that the top layer will return to a dry state.

However, the water absorption and locking ability of the absorbent layer of a diaper is limited. When the amount of urine is large, the moisture cannot be completely absorbed and locked. In this case, if the diaper is squeezed, the water will flow back from the absorbent layer of the diaper, this phenomenon is called liquid reverse osmosis, which will make the top layer of the diaper wet again, which not only makes the user uncomfortable, but also easily leads to skin diseases (such as diaper rash). Under this circumstance, the diaper should be replaced as soon as possible. If it is not replaced, it is also easy to cause urine leakage and bedding pollution.

Therefore, the scientific diaper wetness detection not only needs to know whether the diaper is wet, but also the degree of wetness of the diaper, such as whether the absorbent layer is saturated, whether there is reverse osmosis, and whether it needs to be replaced. When the top layer of the diaper is wet, is it best to distinguish whether the moisture is coining from the top or reverse osmosis from the absorbent layer. Although they are both wet on the top layer of the diaper, they represent two different states, the former can be regarded as the beginning of wetting of the diaper, while the latter can be regarded as the saturated reverse osmosis of the absorbent layer of the diaper, which is a state in urgent need of replacement.

It would be very helpful if a sensor could be placed on a specific layer of the diaper, for example between the top layer and the absorbent layer and could directionally detect the wetness of the top layer and the absorbent layer respectively. To carry out this, a film sensor with double-sided directional wet detection will be a good choice, which can be placed on a specific location/layer of the diaper to achieve wet state detection in a specific direction. It would be ideal if the sensor could further quantify the wet state of the upper and lower sides of a specific location and superimpose the output according to a specified weight (such as increasing the weight of the reverse osmosis state of the absorbent layer). The output value in this way represents the comprehensive wetness of the diaper or the urgency of replacement, which has great reference value for the scientific use and replacement of diapers.

In terms of traditional technology, US Patent Publication No. US2013/0018340A1 discloses an Absorbent Article Fullness Indicator, which disposes a sensor array on the outer surface of the absorbent article, and detects the capacitance change of the absorbent article through the sensor array to detect the degree of wetness. Since the sensor is non-invasive, it is difficult to distinguish the wet condition of different layers inside the absorbent article.

Market demands and deficiencies in traditional technologies all require new technical solutions.

SUMMARY

The technical problem to be solved by the present invention is to provide a sensor/sensing strip with a double-sided directional weighted and quantified wet state detection, which has upper and lower sensing surfaces, it is suitable for being used on different layers of disposable absorbent articles and is able to realize a wet state detection of the upper and lower sides and carry out a quantified treatment. The state weights of the upper and lower sides can be adjusted through parameter settings and the weighted output can be adjusted to meet the different application needs of users. When the sensor is disposed between the top layer and the absorbent layer of the disposable absorbent article, the wet state detection of the top layer and the reverse osmosis state detection of the absorbent layer can be realized, and the output weights of the reverse osmosis state of the absorbent layer can be enhanced as needed, making the absorbent layer reverse osmotic allows the signal to replace the disposable absorbent article to appear faster.

To solve the above technical problems, in a first aspect, the present invention provides a sensor for realizing double-sided directional weighted and quantified wet state detection, including a sensing strip, and the sensing strip includes an upper sensing surface and a lower sensing surface, which can respectively realize a quantitative wet state detection of the upper and lower surfaces, and the wet state of the upper and lower surfaces can be weighted and output according to a preset specific gravity, thereby a weighted and quantified wet state information related to a specific layer and a specific direction of a specific detection object is provided.

Wherein, the sensing strip may include an upper waterproof film corresponding to the upper sensing surface and a lower waterproof film corresponding to the lower sensing surface, a sensing layer may be included between the waterproof films, and the sensing layer is covered by the upper and lower waterproof films.

Wherein, the sensing strip may include a first detection electrode and a second detection electrode, and the first and second detection electrodes are disposed in the sensing layer, which is completely covered by the upper and lower waterproof films, and there is no contact with liquid to be detected during operation; or The first and second detection electrodes are disposed in the sensing layer, wherein the first detection electrode is completely covered by the upper and lower waterproof films, it has no contact with liquid to be detected during operation, and at least a part of the second detection electrode is exposed to the outside through the interlayer edge or incision or slit of the upper and lower waterproof films and contacts the liquid to be detected containing electrolyte, the liquid to be detected is made equipotential with it to form a liquid electrode.

Wherein, the sensing strip may include a first detection electrode and a second detection electrode, the first detection electrode is protected within the sensing layer, and has no contact with liquid to be detected during operation, and the second detection electrode is located on the outer surface of any one of the upper and lower waterproof films and directly contacts the liquid to be detected containing electrolyte, and make the liquid to be detected equipotential with it and form a liquid electrode; and The orthographic projections of the first and second detection electrodes may include overlapping portions, and the electrodes of the overlapping portions form an initial capacitor with a value of $C_0$; and When the liquid electrode covers the outer surfaces of the waterproof films corresponding to the first detection electrode, an electrolytic capacitor is generated between the liquid electrode and the first detection electrode, the first and second detection electrodes output C by adding the initial capacitance $C_0$ and the electrolytic capacitance, and the wet state is represented by the formula $(C-C_0)/C_0$, the bigger the numerical value, the more serious the degree of wet of the specific layer of the specific detection object; and The sensing strip has the capability of length adaptation, and the wet state $(C-C_0)/C_0$ of a specific layer of the specific detection object has nothing to do with the length of the sensing strip.

Wherein, the sensing strip is disposed between top layer and absorbent layer of a disposable absorbent article, the second detection electrode is located on the outer surface of the upper waterproof film and faces the top layer, and its width is equal to the width of the sensing strip, which can shield the signal from the upper sensing surface, thereby realizing a liquid reverse osmosis detection only for the saturated state of the absorbent layer of the disposable absorbent article; or The sensing strip is disposed between top layer and absorbent layer of a disposable absorbent article, and the outer surfaces of the upper and lower waterproof films may respectively include a second detection electrode, it respectively forms an electrode pair with the first detection electrode in the sensing layer, and detects the liquid wet state on the upper sensing surface and the lower sensing surface respectively, the first detection electrode is wider than any of the second detection electrodes, and the orthographic projections of the second detection electrodes on the first detection electrode are within the range of the first detection electrode, this can effectively prevent the liquid to be detected on one of the sensing surfaces from affecting the capacitance detection on the other sensing surface, in this way, the detection function of the wet state of the top layer and the reverse osmosis state of the absorbent layer can be realized respectively.

Wherein, when the liquid to be detected accumulates on the upper and lower sensing surfaces, the first detection electrode, the second detection electrode and the upper waterproof film, the lower waterproof film and the liquid to be detected together form an electrolytic capacitor, the first and second detection electrodes constitute the pole plates of the electrolytic capacitor, and the liquid to be detected constitutes the electrolyte or liquid electrode of the electrolytic capacitor, the waterproof films constitutes the dielectric of the electrolytic capacitor, the capacitance of the electrolytic capacitor is proportional to the area of the liquid to be detected on the sensing surface corresponding to the first detection electrode, and the detection sensitivity of the upper and lower sensing surfaces is proportional to the dielectric constant of the upper and lower waterproof films, and inversely proportional to the thickness of the upper and lower waterproof films, the weight of the wet state of the upper and lower sensing surfaces is proportional to the detection sensitivity of the upper and lower sensing surfaces.

Wherein, the sensing strip may include a first detection electrode, a second detection electrode and a third detection electrode disposed in the sensing layer, the first detection electrode is completely covered by the upper and lower waterproof films, and there is no contact with the liquid to be detected during operation; and The first, second and third detection electrodes are disposed in parallel and extend along the length direction of the sensing strip, the first detection electrode is located at the center of the sensing layer, and the second and third detection electrodes are respectively located on the left and right sides of the first detection electrode, and are exposed to the outside through slitting incisions at the edges of the sensing strip; and When the sensing strip is soaked by the liquid to be detected containing electrolyte, an electrolytic capacitor will be produced between the first and second detection electrodes, and between the first and third detection electrodes respectively, and the capacitance of the electrolytic capacitors is positively related to the area of the liquid to be detected on the upper and lower waterproof films corresponding to the first detection electrode; and An electric double layer capacitor will be produced between the second and third detection electrodes, and the capacitance of the electric double layer capacitor is positively related to the area of the liquid to be detected infiltrating the second and third detection electrodes at the incisions.

Wherein, the combination of the first, second and third detection electrodes can not only provide the directional weighted and quantified wet state detection capability of the upper and lower sides, but also provide the weighted and quantified wet state detection capability in four directions: upper left, lower left, upper right, and lower right.

Wherein, the sensing strip has a soft ribbon-like structure, and its cross-section at any position in the length direction is equal, so that it is suitable to produce disposable absorbent articles of different lengths, as long as the sensing strip is cut off according to the length of the disposable absorbent article and placed on a specific layer of the disposable absorbent article.

Wherein, the waterproof film may include a rigid plastic film, the rigid plastic film may include a BOPP film or a PET film, and the detection electrode may include conductive ink printed line, the conductive ink printed line may include carbon ink printed line.

In another aspect, the present invention provides a manufacturing method for producing a disposable smart absorbent article capable of providing information on a double-sided directional weighted and quantified wetness status, including following steps:

Installing a sensing strip material on a production line of disposable absorbent article;

Pulling out one end of the sensing strip material and cut it according to the desired length to obtain a sensing strip with moderate length;

Disposing the sensing strip on a top layer material of disposable absorbent article, or between the top layer material and an absorbent layer material of disposable absorbent article, or between the absorbent layer material and a leak-proof layer material of disposable absorbent article;

Bonding the sensing strip, the top layer material, the absorbent layer material and the leak-proof layer material to form a bonded combination;

Cutting the bonded combination to generate a disposable smart absorbent article with a specific length, including a sensing strip, a top layer, an absorbent layer, and an anti-leakage layer, which can provide double-sided directional weighted and quantified wet state information; or Installing a sensing strip material on a production line of disposable absorbent article;

Pulling out one end of the sensing strip material, and placing it on a top layer material of disposable absorbent article, or between the top layer material and an absorbent layer material of disposable absorbent article, or between the absorbent layer material and a leak-proof layer material of disposable absorbent article;

Bonding the sensing strip material, the top layer material, the absorbent layer material and the leak-proof layer material to form a bonded combination;

Cutting the bonded combination to generate a disposable smart absorbent article with a specific length, including a sensing strip, a top layer, an absorbent layer, and a leak-proof layer, which can provide double-sided directional weighted and quantified wet state information; and The sensing strip or sensing strip material includes an upper sensing surface and a lower sensing surface, which can respectively realize the quantified wet state detection of the upper and lower surfaces and output the wet state of the upper and lower surfaces according to a preset specific gravity; thereby a weighted and quantified wet state information related to a specific layer and a specific direction of the disposable absorbent article is provided.

Wherein, the sensing strip or sensing strip material may include an upper waterproof film corresponding to the upper sensing surface and a lower waterproof film corresponding to the lower sensing surface, a sensing layer is included between the upper and lower waterproof films, and the sensing layer is covered by the upper and lower waterproof films.

Wherein, the sensing strip or sensing strip material may include a first detection electrode and a second detection electrode, and the first and second detection electrodes are disposed on the sensing layer, it is completely covered by the upper and lower waterproof films, and has no contact with liquid to be detected during operation; or The first and second detection electrodes are disposed in the sensing layer, wherein the first detection electrode is completely covered by the upper and lower waterproof films, and has no contact with liquid to be detected during operation, and at least a part of the second detection electrode is exposed to the outside through the interlayer edges or incisions of the waterproof films and contacts the liquid to be detected containing electrolyte, so that the liquid to be detected is equipotential with it and constitutes a liquid electrode.

Wherein, the sensing strip or sensing strip material may include a first detection electrode and a second detection electrode, the first detection electrode is protected within the sensing layer, and has no contact with liquid to be detected during operation, and the second detection electrode is located on the outer surface of any one of the upper and lower waterproof films and directly contacts the liquid to be detected containing electrolyte, so that the liquid to be detected is equipotential with it and constitutes a liquid electrode; and The orthographic projections of the first and second detection electrodes may include overlapping portions, and the electrodes of the overlapping portions form an initial capacitor with a value of $C_0$; and When the liquid electrode covers the outer surfaces of the waterproof films corresponding to the first detection electrode, an electrolytic capacitance is generated between the liquid electrode and the first detection electrode, the first and second detection electrodes output C by adding the initial capacitance $C_0$ and the electrolytic capacitance, and the wet state is represented by the formula $(C-C_0)/C_0$, the larger the numerical value, the more serious the degree of wet of the specific layer of the specific detection object; and The sensing strip has the capability of length adaptation, and the wet state $(C-C_0)/C_0$ of the specific layer of the specific detection object has nothing to do with the length of the sensing strip.

Wherein, the sensing strip or sensing strip material is disposed between the top layer and the absorbent layer of the disposable absorbent article, the second detection electrode is located on the outer surface of the upper waterproof film and faces the top layer, and its width is equal to the width of the sensing strip or sensing strip material, which can shield the signal from the upper sensing surface, thereby realizing the liquid reverse osmosis detection only for the saturated state of the absorbent layer of the disposable absorbent article; or The sensing strip or sensing strip material is disposed between the top layer and the absorbent layer of the disposable absorbent article, and the outer surfaces of the upper and lower waterproof films may respectively include a second detection electrode, it respectively forms an electrode pair with the first detection electrode in the sensing layer, and detects the liquid presence state on the upper sensing surface and the lower sensing surface respectively, the first detection electrode is wider than any of the second detection electrodes, and the orthographic projections of the second detection electrodes on the first detection electrode are within the range of the first detection electrode, this can effectively prevent the liquid to be detected on one of the sensing surfaces from affecting the capacitance detection on the other sensing surface, in this way, the detection function of the wet state of the top layer and the reverse osmosis state of the absorbent layer can be realized respectively.

Wherein, when the liquid to be detected accumulates on the upper and lower sensing surfaces, the first detection electrode, the second detection electrode, the upper waterproof film, the lower waterproof film and the liquid to be detected together constitute an electrolytic capacitor, wherein the first and second detection electrodes constitute the pole plates of the electrolytic capacitor, and the liquid to be detected constitutes the liquid electrode of the electrolytic capacitor, the waterproof films constitute the dielectric of the electrolytic capacitor, the capacitance of the electrolytic capacitor is proportional to the area of the liquid electrode on the sensing surface corresponding to the first detection electrode, and the detection sensitivity of the upper and lower sensing surfaces is proportional to the dielectric constant of the upper and lower waterproof films, and inversely proportional to the thickness of the upper and lower waterproof films, the weight of the wet state of the upper and lower sensing surfaces is proportional to the detection sensitivity of the upper and lower sensing surfaces.

Wherein, the sensing strip or sensing strip material may include a first detection electrode, a second detection electrode and a third detection electrode disposed within the sensing layer, wherein the first detection electrode is completely covered by the upper and lower waterproof films, and has no contact with the liquid to be detected during operation; and The first, second and third detection electrodes are disposed in parallel and extend along the length direction of the sensing strip or the sensing strip material, the first detection electrode is in the center of the sensing layer, the second and the third detection electrodes are respectively located on left and right sides of the first detection electrode, and are exposed to the outside through slitting incisions at the edges of the sensing strip or the sensing strip material; and When the sensing strip or sensing strip material is soaked by the liquid to be detected containing electrolyte, an electrolytic capacitor will be produced between the first and second detection electrodes, and between the first and third detection electrodes respectively, the capacitance of the electrolytic capacitor is positively related to the area of the liquid to be detected on the upper and lower waterproof films corresponding to the first detection electrode; and An electric double layer capacitor will be produced between the second and third detection electrodes, and the capacitance of the electric double layer capacitor is positively related to the area of the liquid to be detected infiltrating the second and third detection electrodes at the incisions.

Wherein, the combination of the first, second and third detection electrodes can not only provide the directional weighted and quantified wet state detection capability of the upper and lower sides, but also provide the weighted and quantified wet state detection capability in four directions: upper left, lower left, upper right, and lower right.

Wherein, the sensing strip material has a soft ribbon-like structure, and its cross-section at any position in the length direction is equal, it is suitable for the production of disposable absorbent articles of different lengths, the waterproof film may include a rigid plastic film, the rigid plastic film may include a BOPP film or a PET film, the detection electrode may include conductive ink printed lines, the conductive ink printed line may include carbon ink printed lines.

Wherein, the length of the sensing strip is in the range of 20 cm to 1 m, the width of the sensing strip material is in the range of 1 cm to 10 cm, the length is in the range of 100 m to 10,000 m, and the thickness is in the range of 10 micrometers to 1 mm, the top layer may include a non-woven fabric, the absorbent layer may include polymer water-absorbing resin, the leak-proof layer may include a polyethylene film, and the top layer material may include rolled non-woven fabric, the leak-proof layer material may include rolled polyethylene film, the absorbent layer material may include absorbent core, the disposable absorbent articles may include diapers, insertion pads, pull-up pants, training pants, sanitary napkins or maternity napkins.

In still another aspect, the present invention provides a method for manufacturing a sensing strip material for realizing double-sided directional weighted and quantified wet state detection, including following steps:

Disposing 2*M+1 parallel detection electrodes on a wide format rolled waterproof film material by printing;

Compounding another wide format rolled waterproof film material with the wide format rolled waterproof film material provided with the detection electrodes to generate a wide format rolled sensing strip material, the detection electrodes are located in a composite film interlayer of the wide format rolled sensing strip material;

Carrying out M+1 ways slitting on the wide format rolled sensing strip material, and the slitting lines are set at the middle position of each of the odd detection electrodes, and the corresponding detection electrodes and the rolled waterproof film materials are cut together to generate M rolls of sensing strip materials, each roll of sensing strip material includes first, second and third detection electrodes, wherein the second and third detection electrodes are located on the left and right sides of the sensing strip material and are exposed to the outside through the slitting incision, as for the first detection electrode located in the middle of the sensing strip material has no intersection with the slitting lines; and The width of the sensing strip material is in the range of 1 cm to 10 cm, the length is in the range of 100 meters to 10,000 meters, and the thickness is in the range of 10 micrometers to 1 mm.

In yet another aspect, the present invention provides a disposable smart absorbent article capable of providing double-sided directional weighted and quantified wet state information, including a top layer, an absorbent layer, an anti-leakage layer, and the sensor according to claim 1, the sensor is disposed on the top layer, or between the top layer and the absorbent layer, or between the absorbent layer and the leak-proof layer, and realizes the double-sided directional weighted and quantified wet state detection function, the absorbent layer includes polymer absorption material, the top layer includes a hydrophilic non-woven fabric, and the leak-proof layer includes a breathable or non-breathable polyethylene film.

The beneficial effect of the present invention is to provide a disposable sensor with two sensing surfaces, the sensor is suitable for use on a specific layer of a diaper and can detect the quantified wet state of the upper and lower sensing surfaces respectively, different detection sensitivities can be set for the upper and lower sensing surfaces to superimpose signals with different weights to meet the requirements of different users for the use of diapers.

At the same time, the sensing strips are in the form of sensing strip materials before they are placed in the diapers. The detection electrodes are disposed in parallel, and the cross-sections at any position in the length direction are equal, so that they can be adapted to the production of diapers of different sizes and lengths, as long as it is cut off and placed on a specific layer of the diaper during production, cutting it at any position will not affect the integrity and working performance of the sensor, so that it can be used as a standardized general diaper production material.

The present invention is suitable for the intelligent upgrading and transformation of traditional disposable absorbent articles, it has an electronic/intelligent wetness detection function by simply adding the sensing strip, it provides an objective and scientific basis for the rational use and timely replacement of disposable absorbent articles.

BRIEF DESCRIPTION OF THE DRAWINGS

To illustrate the technical solutions of the embodiments of the present invention more clearly, the following briefly introduces the drawings that need to be used in the embodiments. Obviously, the drawings in the following description are only some embodiments of the present invention, for those of ordinary skill in the art, other drawings can also be obtained from these drawings without creative effort.

DETAILED DESCRIPTION

The following descriptions of the various embodiments refer to the accompanying drawings to illustrate specific embodiments in which the invention may be practiced. The direction and position terms mentioned in the present invention, such as "up", "down", "front", "rear", "left", "right", "inside", "outside", "top", "bottom", "side", "upper", "lower", etc. are only references to the orientation or position of the drawings. Therefore, the directional and positional terms used are for describing and understanding the present invention, rather than limiting the protection scope of the present invention.

Figure 1:
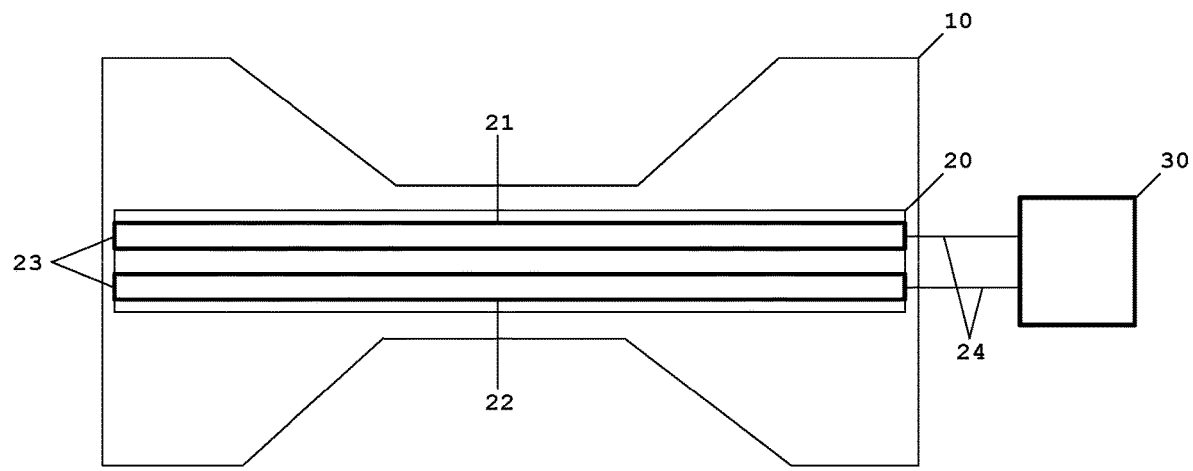
FIG. 1 is a schematic structural diagram of application of a sensor for realizing double-sided directional weighted and quantified wet state detection in a disposable absorbent article according to an embodiment of the present invention.

The present invention will be further described below in conjunction with the accompanying drawings. FIG. 1 is a schematic structural diagram of an application of a sensor for realizing double-sided directional weighted and quantified wet state detection in a disposable absorbent article according to an embodiment of the present invention. This embodiment includes a disposable absorbent article 10, which includes diapers, insertion pads, pull-up pants, training pants, sanitary napkins, maternity napkins, urine pads, and the like. These disposable absorbent articles typically include a top layer (top sheet, dry layer, which faces the user's skin during use), a leak-proof layer (anti-leakage layer, back sheet, which faces away from the user's skin during use), and the absorbent layer (absorption layer, located between the top layer and the leak-proof layer), these are the three key components.

This embodiment also includes a sensor 20 disposed on a specific layer of the disposable absorbent article 10 (for example, on the top layer, between the top layer and the absorbent layer, or between the absorbent layer and the leak-proof layer, etc.), which can realize a double-sided directional weighted and quantified wet state detection. The sensor is a composite film structure, like a soft ribbon, which is also referred to as a sensing strip in the embodiment of the present invention, and the reference numeral 20 can represent the sensor itself or the sensing strip of the sensor. The sensing strip 20 includes a first detection electrode 21 and a second detection electrode 22. The combination of the detection electrodes 21 and 22 is denoted by 23. It is usually printed on a waterproof film (including rigid plastic films, such as BOPP—biaxially oriented polypropylene film, PET—polyester film, etc.) with conductive ink (such as carbon ink, carbon paddle) by gravure printing, flexo printing, and coating etc., it is a kind of conductive lines, so the detection electrodes can also be called conductive ink lines or carbon ink lines in the embodiment of the present invention.

This embodiment also includes an external detection device 30, the detection device includes capacitance detection device, which is used in combination with the detection electrode 23 through the electrical connection 24, the wet state detection of the disposable absorbent article 10 can be realized by capacitive means, that is the wet state is quantified and digitized. To facilitate the electrical connection with the capacitance detection device 30, one end of the sensing strip 20 is usually flush or substantially flush with the edge of one end of the disposable absorbent article, in this way, the capacitance detection device can be easily clamped on the edge of the disposable absorbent article and electrically connected with the sensing strip therein.

Putting the sensing strip 20 into the disposable absorbent article to detect the wet state is a typical application of the sensor of the embodiment of the present invention. After the sensor is put into the disposable absorbent article, it has an electronic/intelligent wetness detection function. In the embodiment of the present invention, a disposable absorbent article with an electronic/intelligent wetness detection function is called a disposable smart absorbent article, and the embodiment of the present invention is particularly suitable for the intelligent/smart upgrade of the traditional disposable absorbent article.

Figure 2:
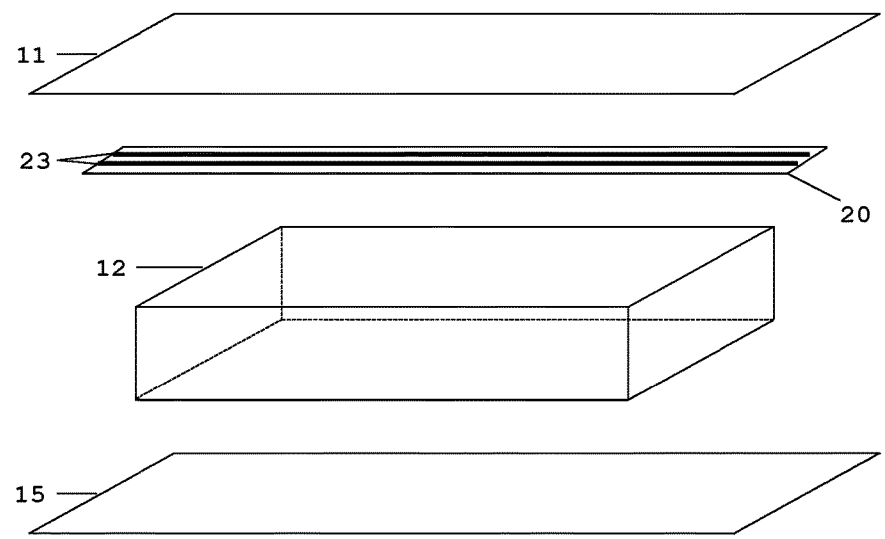
FIG. 2 is a schematic diagram of a layered structure when a sensor according to an embodiment of the present invention is disposed between the top layer and the absorbent layer of a disposable absorbent article.

FIG. 2 is a schematic diagram of a layered structure when a sensor according to an embodiment of the present invention is disposed between the top layer and the absorbent layer of a disposable absorbent article. The following description takes diapers as an example, and the relevant descriptions are also applicable to other disposable absorbent articles such as insertion pads, pull-up pants, training pants, sanitary napkins, maternity napkins, changing pads, and the like. The diaper in this embodiment typically includes a top layer 11, an absorbent layer 12 and a leak-proof layer 15. During use, the top layer 11 will be in direct contact with user's skin, such as wrapping the user's crotch. When the user urinates, the urine will enter the absorbent layer 12 through the hydrophilic and loose and breathable top layer 11, and it will then be absorbed and locked by the wood pulp and the polymer absorbent material (SAP) in the absorbent layer, so that the top layer 11 can be restored to dryness later. As for the leak-proof layer 15, it is mainly used to prevent leakage of urine, and is usually composed of a breathable or non-breathable polyethylene film (PE).

This embodiment includes a sensing strip 20, and the sensing strip includes detection electrode 23, which is composed of a first and a second detection electrodes. To realize the detection of the wet state of the top layer of the diaper and the reverse osmosis state of the absorbent layer, the sensing strip 20 is preferably disposed between the top layer 11 and the absorbent layer 12 of the diaper. Since the sensing strip has upper and lower surfaces and have the capability of wet detection/wet sensing in the directions corresponding to the upper and lower surfaces, so the upper surface and lower surface of the sensing strip are called the upper sensing surface and the lower sensing surface respectively. The sensing strip can detect the urine from the user on the top layer (through the upper sensor surface), and detect the liquid reversed from the absorbent layer (through the lower sensing surface), so it is a double-sided directional (upper and lower direction) wet detection. For the convenience of expression, each component of the diaper in this embodiment (including the top layer 11, the absorbent layer 12, the leak-proof layer 15, and the sensing strip 20) is drawn in a layered manner. In practical applications, the above components are bonded together by adhesives.

Figure 3:
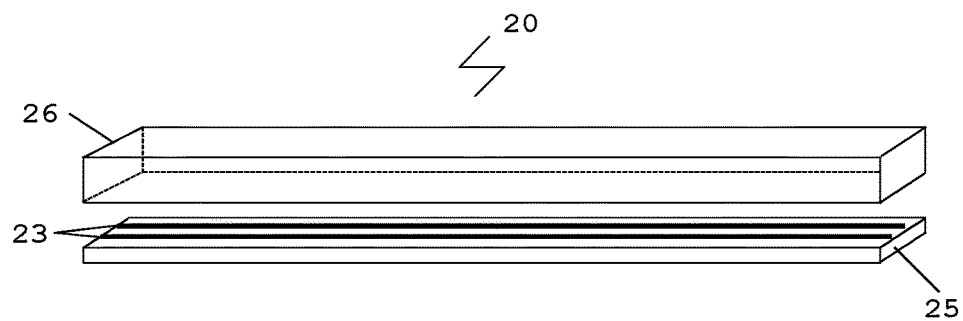
FIG. 3 is a schematic diagram of a layered structure of a sensing strip according to an embodiment of the present invention.

FIG. 3 is a schematic diagram of a layered structure of a sensing strip according to an embodiment of the present invention. The sensing strip 20 includes a lower waterproof film 25, an upper waterproof film 26, and detection electrode 23 printed/disposed on the inner surface of the lower waterproof film. For the convenience of expression, each component of the sensing strip is drawn in a layered manner. In practical applications, the above-mentioned components are bonded together by adhesives, and it can also be pressed together by a hot-pressing process. The upper and lower waterproof films can seal the main body (circuit) of the detection electrodes.

In this embodiment, it can be found that the detection electrodes of the sensing strip 20 are disposed in parallel and symmetrical from head to tail, which means that the sensing strip is suitable to produce diapers of any specification and length, as long as the sensing strip is cut off according to the length of the diaper and then it can be used. The cross-section of the sensing strip cut at any position is the same, which will not affect its working performance. This is an important characteristic for the production material of diapers. A rolled material with this characteristic does not need to be positioning cut during production, just cut to the desired length and it is okay for use.

Figure 4:
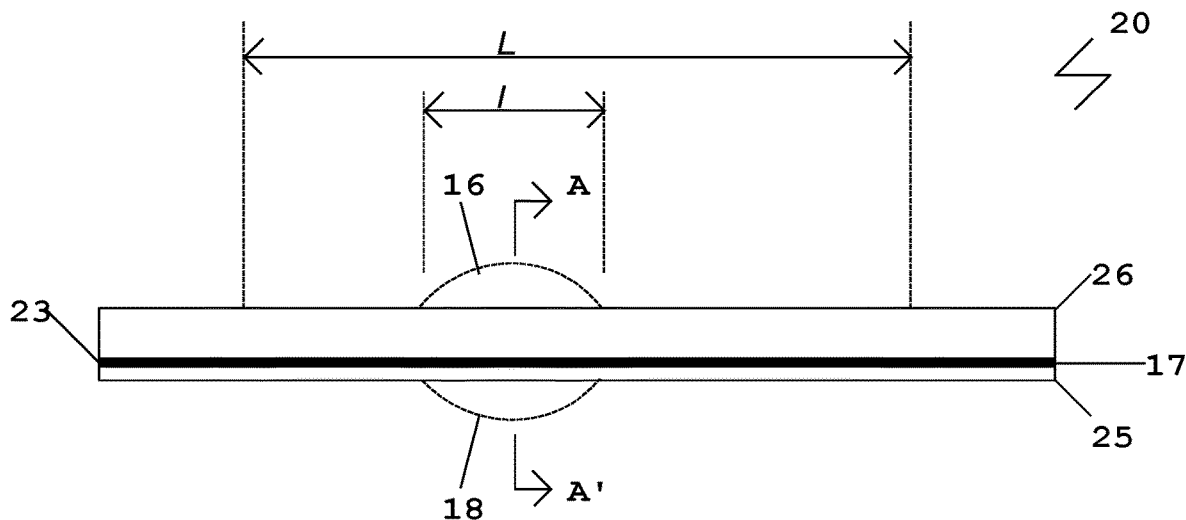
FIG. 4 is a schematic longitudinal section view of a side structure of a sensing strip according to an embodiment of the present invention.

FIG. 4 is a schematic longitudinal section view of a side structure of a sensing strip according to an embodiment of the present invention. The sensor/sensing strip 20 includes the upper waterproof film 26, the lower waterproof film 25, and a sensing layer 17 between the upper and lower waterproof films, the sensing layer 17 includes detection electrodes 23. When the liquid to be detected containing electrolyte (such as urine containing salt) 16 is accumulated on the outer surface of the upper waterproof film 26, an electrolytic capacitance is generated between the two detection electrodes in the sensing layer 17. Likewise, when the liquid containing electrolyte is accumulated on the outer surface of the lower waterproof film 25, for example, when the urine 18 is reversed from the absorbent layer, another electrolytic capacitance will be generated between the two detection electrodes in the sensing layer 17. If the thickness (or the dielectric constant) of the upper and lower waterproof films is different, the capacitance values generated by the liquid to be detected with the same coverage are different, this will cause a difference in the detection sensitivity of the upper and lower sensing surfaces. The thinner the waterproof film and the greater the dielectric constant, the bigger the capacitance value it produces, that is, the higher the detection sensitivity. In this embodiment, L is the total effective length/detection range of the sensing strip 20, l is the actual coverage/length of the liquids 16 and 18 on the sensing strip, and the ratio of l to L (l/L) is called the degree of wet of the sensor.

For the convenience of description, the side of the waterproof films 25 and 26 in contact with the sensing layer 17 is called the inner surface, and the side that is not in contact with the sensing layer 17 is called the outer surface. The side of the outer surface of the upper waterproof film 26 is called the upper sensing surface, it faces the user when in use and can detect the liquid from the user. The outer surface of the lower waterproof film 25 is called the lower sensing surface, it faces away from the user when in use, and can detect the reverse osmosis liquid under the sensing strip. In practical applications, the sensing strip can be disposed on different layers of the diaper as needed, and the thickness of the upper and lower waterproof films can also be selected as needed. In this embodiment, the thickness of the upper waterproof film 26 is three times that of the lower waterproof film 25, so that under the condition that the upper and lower waterproof films have the same texture (the same dielectric constant), the detection sensitivity of the lower sensing surface is 3 times higher than that of the upper sensing surface, that is, compared with the upper sensing surface, the lower sensing surface achieves 3 times the weighted output.

When there is liquid on both the upper and lower sensing surfaces at the same time, the signals (capacitance values) generated will be superimposed and output. When the upper and lower sensitivities are different, the proportions of the signal superimposed output are different, and the superimposed proportion of the sensing surface in the embodiment of the present invention is proportional to its detection sensitivity. In the above case, when the sensing strip is disposed between the top layer and the absorbent layer of the diaper, because of the superimposed specific gravity of the lower sensing surface is 3 times that of the upper sensing surface, so the reverse osmosis state of the absorbent layer will make the diaper changing signal appear faster than the wet state of the top layer.

Figure 5:
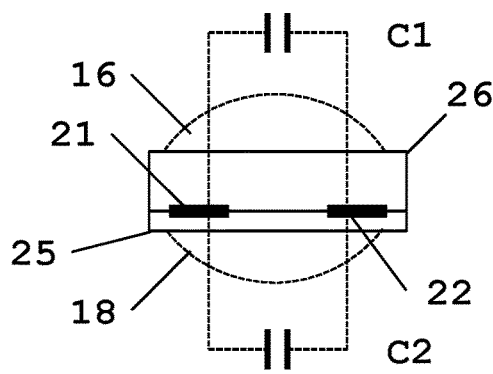
FIG. 5 is a schematic diagram of the A-A' cross-sectional structure and corresponding equivalent circuit diagram of a sensing strip according to an embodiment of the present invention.

FIG. 5 is a schematic diagram of the A-A' cross-sectional structure and corresponding equivalent circuit diagram of a sensing strip according to an embodiment of the present invention. It is a further description of the above-mentioned embodiment of FIG. 4, it includes the upper waterproof film 26, the lower waterproof film 25, and the detection electrodes 21 and 22 between the upper and lower waterproof films. Besides, this embodiment further includes the liquid to be detected containing electrolyte (e.g., urine) 16 which accumulated on the outer surface of the upper waterproof film 26, and the liquid to be detected containing electrolytes (e.g., urine) 18 which accumulated on the outer surface of the lower waterproof film 25. In this embodiment of the present invention, 21 is referred to as a first detection electrode, and 22 is referred to as a second detection electrode. The upper waterproof film 26, the first detection electrode 21, the second detection electrode 22, and the liquid 16 together form a non-polar electrolytic capacitor C1, among them, 21 and 22 are the electrodes of capacitor C1, 26 is the dielectric of capacitor C1, 16 is the electrolyte of capacitor C1, and the capacitance of capacitor C1 is inversely proportional to the thickness of 26, proportional to the dielectric constant of 26, proportional to the coverage/length l of liquid 16.

At the same time, the lower waterproof film 25, the first detection electrode 21, the second detection electrode 22, and the liquid 18 together form another non-polar electrolytic capacitor C2, wherein 21 and 22 are the electrodes of the capacitor C2, 25 is the dielectric of capacitor C2, 18 is the electrolyte of capacitor C2, the capacitance of capacitor C2 is inversely proportional to the thickness of 25, proportional to the dielectric constant of 25, and proportional to the coverage/length l of liquid 18.

The capacitors C1 and C2 are connected in parallel, and the capacitance value C between the electrodes 21 and 22 is the sum of the above two capacitors, that is, C=C1+C2. In this embodiment, under the condition of the same liquid coverage/length, the value of C2 will be bigger than that of C1, because the thickness of the lower waterproof film 25 constituting C2 is thinner than that of the upper waterproof film 26 constituting C1, as a result, the detection sensitivity of the lower sensing surface is higher than that of the upper sensing surface, so that the reverse osmosis state of the diaper absorbent layer can make the diaper replacement signal appear faster than the wet state of the top layer (when the sensing strip is placed between the top layer and the absorbent layer).

Figure 6:
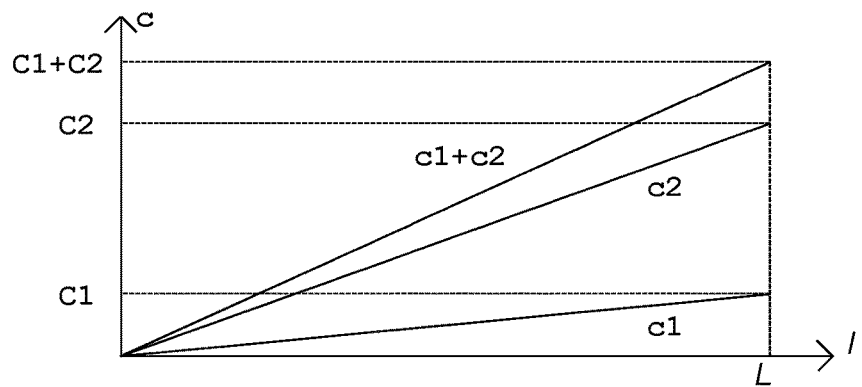
FIG. 6 is a graph showing the relationship between the capacitance value of a sensing strip and the liquid coverage/length according to an embodiment of the present invention

FIG. 6 is a graph showing the relationship between the capacitance value of a sensing strip and the liquid coverage/length according to an embodiment of the present invention. The abscissa l in this figure is the liquid coverage/length of the upper and lower sensing surfaces, and L is the effective detection range/length of the sensing strip 20. The ordinate c in this figure is the capacitance value between the detection electrodes 21 and 22, wherein c1 is the capacitance value generated by the liquid 16 on the upper sensing surface, c2 is the capacitance value generated by the liquid 18 on the lower sensing surface, the total capacitance value of the upper and lower sensing surfaces is c1+c2. When the liquid to be detected covers the entire effective range L of the sensor, c1=C1, c2=C2, the total capacitance between the detection electrodes 21 and 22 is C=C1+C2, this is the maximum value.

It can be seen from this figure that in the case of the same liquid coverage/length, the capacitance c2 is bigger than c1, that is to say, in the capacitance value C between the electrodes 21 and 22, the proportion of the lower sensing surface (weighting coefficient) is higher than that of the upper sensing surface, when the sensing strip is placed between the top layer and the absorbent layer of the diaper, under the same liquid coverage/length, the reverse osmosis state of the absorbent layer corresponding to the lower sensing surface can make the diaper changing signal appear faster than the wet state of the upper sensing surface.

Figure 7:
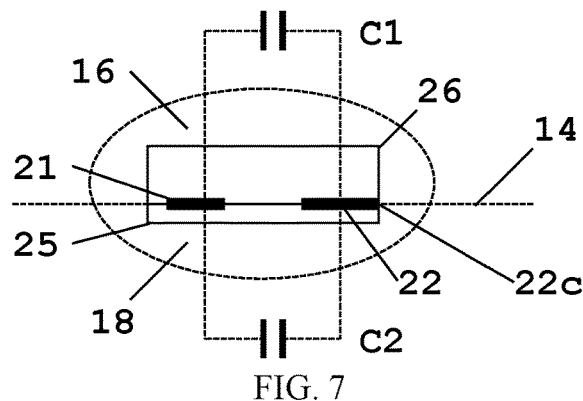
FIG. 7 is another schematic cross-sectional structure diagram and corresponding equivalent circuit diagram of a sensing strip according to an embodiment of the present invention.

FIG. 7 is another schematic cross-sectional structure diagram and corresponding equivalent circuit diagram of a sensing strip according to an embodiment of the present invention. The main difference from the embodiment shown in FIG. 5 is that the second detection electrode 22 of this embodiment is located at the edge of the sensing layer/interlayer, its outer edge is at the seam line 22c of the upper and lower waterproof films and is exposed to the outside, when the liquid 16/18 containing electrolyte infiltrates the position of 22c, it can be in contact with the second detection electrode 22, since the liquid containing electrolyte is conductive, it becomes equal potential with the electrode 22 after it contacts with the electrode 22, and becomes a part of the electrode 22 on the circuit, in this embodiment, the liquid with the same potential as the detection electrode is called liquid electrode or electrolyte electrode. The seam line 22c can also be called incision or slitting line. In practical applications, a slitting knife can be used to cut one side of a composite film composed of the upper and lower waterproof films, making the second detection electrode located in the sensing layer can be neatly exposed to the outside through the incision/slitting line 22c.

Reference number 14 in this embodiment is the dividing line between the upper and lower sensing surfaces, when the liquid 16 containing electrolyte infiltrates the upper sensing surface and contacts 22c, the upper waterproof film 26, the first detection electrode 21, the second detection electrode 22 and the liquid 16 together constitute a non-polar electrolytic capacitor C1, wherein the detection electrodes 21 and 22 are the solid electrodes of the capacitor C1, 16 is the electrolyte (liquid electrode) of the capacitor C1, 26 is the dielectric of the capacitor C1, and the capacitance of the capacitor C1 is inversely proportional to the thickness of 26, proportional to the dielectric constant of 26 and proportional to the coverage/length l of the liquid 16 above the first detection electrode 21.

At the same time, when the liquid 18 containing electrolyte infiltrates the lower sensing surface and contacts with 22c, it will also become a liquid electrode with the same potential as the electrode 22, hereby the lower waterproof film 25, the first detection electrode 21, the second detection electrode 22 and the liquid 18 together constitute a non-polar electrolytic capacitor C2, the detection electrodes 21 and 22 are solid electrodes of the capacitor C2, 18 is the electrolyte (liquid electrode) of the capacitor C2, and 25 is the dielectric of the capacitor C2, the capacitance of C2 is inversely proportional to the thickness of 25, proportional to the dielectric constant of 25, and proportional to the coverage/length l of the liquid 18 under the first detection electrode 21.

In this embodiment, the thickness of the lower waterproof film 25 is about one third of that of the upper water film 26, if the material texture is the same (i.e., the dielectric constant is the same), under the condition that the sensor is completely wetted, the capacitance of C2 is about 3 times that of C1, thereby achieving a 3 times weighted output of the reverse osmosis state of the absorbent layer of the disposable absorbent article in relation to the lower waterproof film (when the sensing strip is placed between the top layer and the absorbent layer of the diaper).

Compared with the foregoing embodiment shown in FIG. 5, the detection sensitivity of this embodiment is doubled. C1 in the embodiment shown in FIG. 5 is formed by the capacitor between the electrode 21 and the liquid 16 and the capacitor between the liquid 16 and the electrode 22 in series. However, the capacitor C1 of this embodiment shown in FIG. 7 is directly produced between the electrode 21 and the liquid 16, which is twice as bigger in value. This structure has higher detection sensitivity.

Figure 8:
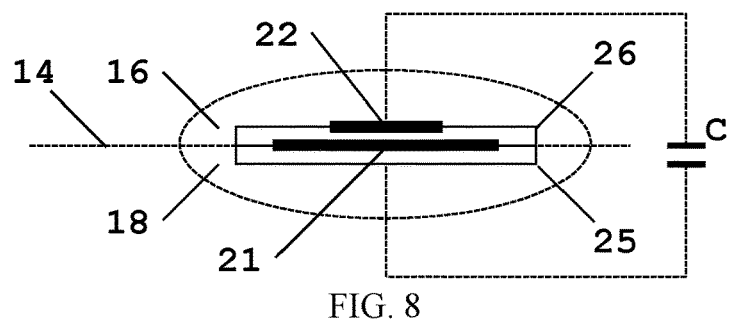
FIG. 8 is still another schematic cross-sectional structure diagram and corresponding equivalent circuit diagram of a sensing strip according to an embodiment of the present invention.

FIG. 8 is still another schematic cross-sectional structure diagram and corresponding equivalent circuit diagram of a sensing strip according to an embodiment of the present invention. In this embodiment, the first detection electrode 21 is disposed in the sensing layer without contact with liquid, and the second detection electrode 22 is disposed on the outer surface of the upper waterproof film 26, its width is half of the first detection electrode 21. In the dry state, there is an initial capacitor/capacitance $C_0$ between the detection electrodes 21 and 22, this capacitor can be considered as a parallel plate capacitor, 21 and 22 are two parallel plates, and its capacitance is proportional to the overlapping area of the two plates and the dielectric constant of the material between the plates. When the upper sensing surface is wetted by the liquid 16, the electrolyte liquid 16 is in contact with the electrode 22 and has an equal potential with 22, thereby becoming a liquid electrode and extending the electrode 22 to the coverage of the liquid 16, this is equivalent to doubling the overlapping area of the plates 22 and 21. In this case, the upper waterproof film 26, the first detection electrode 21, the second detection electrode 22, and the electrolyte liquid 16 together constitute an electrolytic capacitor, when the upper sensing surface is fully soaked by the liquid 16, the value of the electrolytic capacitor is about $1\times C_0$, plus the initial capacitance $C_0$, so the total capacitance $C=2\times C_0$. Due to the presence of the liquid on the upper sensing surface, C is doubled compared to that in the dry state. From this point of view, it can be considered that the detection sensitivity of the upper sensing surface of this embodiment is 1.

When the liquid further penetrates the absorbent layer and when the absorbent layer is saturated and reverse osmosis occurs, then the lower sensing surface will also be infiltrated by the liquid. At this time, the liquid 18 and 16 are connected and become part of the electrode 22, and another electrolytic capacitor is generated between the liquid 18 and the first detection electrode 21. Assuming that the thickness and material of the upper and lower waterproof films are the same, and the width of the electrode 21 is twice that of 22, the electrolytic capacitance value generated between the electrode 21 and the liquid 18 under the condition of full wetting is about $2\times C_0$, adding the initial capacitance $C_0$ and the electrolytic capacitance $1\times C_0$ of the upper sensing surface, then the total capacitance value of the sensor of this embodiment under the condition of full immersion is $C=4\times C_0$.

Since the liquid 18 on the lower sensing surface will generate a capacitance value of $2\times C_0$, it can be considered that the detection sensitivity of the lower sensing surface is 2. It can be seen from the foregoing analysis that the detection sensitivity of the upper sensing surface of this embodiment is 1, thus the total sensitivity (upper sensitivity+lower sensitivity) is 3, if $(C-C_0)/C_0$ is used to represent the comprehensive wet state of the disposable absorbent article, the value ranges from 0 to 3, with 0 representing a fully dry state and 3 representing a fully wet state. In addition, it should be noted that the wet state (degree of wetness) formula $(C-C_0)/C_0$ of this embodiment of the present invention is only related to the liquid infiltration ratio of the sensing strip and has nothing to do with the length of the sensing strip. Although different specifications of diapers may be equipped with sensing strips of different lengths, the capacitance values generated during use are also different (the longer the sensing strips, the bigger the capacitance value), however, the value $(C-C_0)/C_0$ remains unchanged, and the user does not need to set different thresholds for triggering the wetness alarm for diapers with different lengths of sensing strips, that is, the wet state of this embodiment has adaptive capability.

Figure 9:
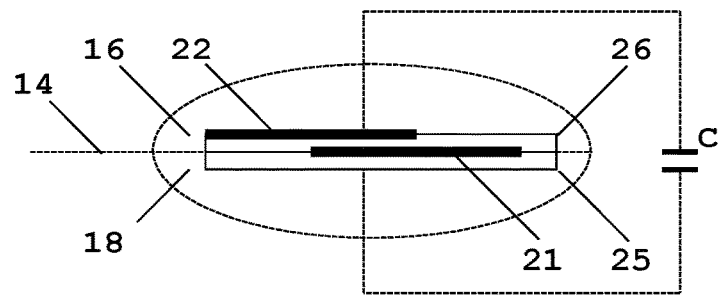
FIG. 9 is yet another schematic cross-sectional structure diagram and corresponding equivalent circuit diagram of a sensing strip according to an embodiment of the present invention.

FIG. 9 is yet another schematic cross-sectional structure diagram and corresponding equivalent circuit diagram of a sensing strip according to an embodiment of the present invention. Although its structure is different from that shown in FIG. 8, its initial capacitance value and the sensitivity of the upper and lower sensing surfaces are the same, which is a variation of the embodiment shown in FIG. 8.

Figure 10:
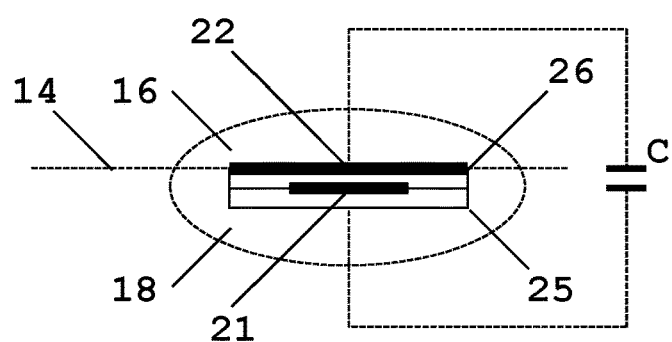
FIG. 10 is yet again another schematic cross-sectional structure diagram and corresponding equivalent circuit diagram of a sensing strip according to an embodiment of the present invention.

FIG. 10 is yet again another schematic cross-sectional structure diagram and corresponding equivalent circuit diagram of a sensing strip according to an embodiment of the present invention. When the liquid 16 containing electrolyte is present on the upper sensing surface, it contacts with the second detection electrode 22 and is equipotential with 22 to become a liquid electrode. Since the width of the second detection electrode 22 in this embodiment of the present invention is consistent with the width of the sensing strip, it shields the liquid 16 on the upper sensing surface, so the liquid 16 on the upper sensing surface does not have any influence on the first detection electrode 21, regardless of whether the liquid 16 exists or not, the capacitance between the first and second detection electrodes maintains the initial capacitance value $C_0$ unchanged.

Only when the liquid 16 penetrates downward and is converted into the liquid 18 corresponding to the lower sensing surface, will it affect the first detection electrode 21, under this circumstance, the first and second detection electrodes 21 and 22, the lower waterproof film 25 and the liquid 18 containing electrolyte together constitute a non-polar electrolytic capacitor C, since the width of the electrode 21 is half of the electrode 22, when the liquid 18 completely covers the lower sensing surface, the newly added electrolytic capacitance value is equal to the initial capacitance value $C_0$ generated by the overlapping of the shadows of the electrodes 21 and 22, at this time, the total capacitance $C=2\times C_0$. The wet state (degree of liquid infiltration) of the lower sensing surface of this embodiment can be expressed by the formula $(C-C_0)/C_0$, when the degree of infiltration is 0 (i.e., $C=C_0$), it means that there is no liquid on the lower sensing surface; when the degree of infiltration is 1 (i.e., $C=2\times C_0$), it means that the lower sensing surface is completely covered by liquid. That is, in this embodiment, the detection sensitivity of the upper sensing surface is 0 and the detection sensitivity of the lower sensing surface is 1. This is a special case of the double-sided directional wet detection in the embodiment of the present invention, when the sensing strip is disposed between the top layer and the absorbent layer of the diaper, it can realize the directional detection function only for the reverse osmosis state of the absorbent layer of the diaper.

Figure 11:
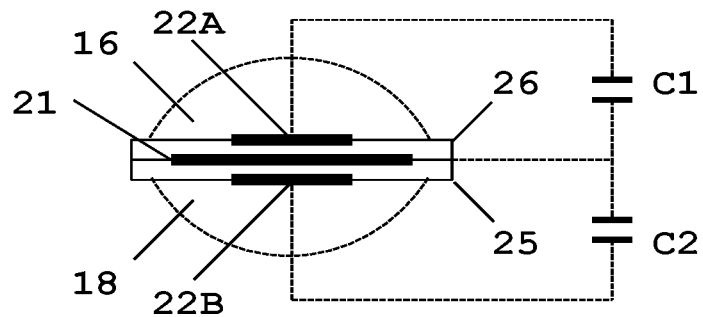
FIG. 11 is a schematic cross-sectional structure diagram and corresponding equivalent circuit diagram of a sensing strip including a second detection electrode that can contact the liquid to be detected on the outer surfaces of both the upper and lower waterproof films according to an embodiment of the present invention.

FIG. 11 is a schematic cross-sectional structure diagram and corresponding equivalent circuit diagram of a sensing strip including a second detection electrode that can contact the liquid to be detected on both the outer surfaces of the upper and lower waterproof films according to an embodiment of the present invention. The first detection electrode 21 can form a first set of detection electrodes (electrode pair) with the second detection electrode 22A on the upper waterproof film, and together with the upper waterproof film 26 and the liquid 16 constitute an electrolytic capacitor C1, it can also form a second set of detection electrodes (electrode pair) with the second detection electrode 22B on the lower waterproof film, and together with the lower waterproof film 25 and the liquid 18 form an electrolytic capacitor C2, therefore, C1 and C2 can independently represent the quantitative wet state of the upper and lower sensing surfaces. In this structure, the first detection electrode is wider than the any of the second detection electrodes, and the orthographic projection of the second detection electrode on the first detection electrode is completely within the range of the first detection electrode, so as to effectively prevent the liquid to be detected on one of the sensing surfaces from affecting the capacitance detection on the other sensing surface.

In practical applications, the first and second detection electrodes can also have more changes, for example, the widths, positions, and mutual relationships of the first and second detection electrodes can have more changes and achieving different detection effects, which will not be repeated here. At the same time, it can also be found that the structures of the sensing strips in the above embodiments of the present invention are consistent in the length direction, and the cross-sections of the sensing strips cut off at any length are the same. Before being integrated with the diaper, the sensing strip of the embodiment of the present invention can be rolled into a film roll, and the length of each roll can reach several hundred meters to several thousand meters, and can be used to produce hundreds to thousands of diapers, this is compatible with the current production materials and production processes of diapers, brand new products can be produced without any technical transformation of the existing production equipment, and at the same time, there is no need to change the main materials of the existing diapers, and it will not affect the appearance and basic performance of the existing diapers, so it is a low-cost, high-performance and standardizable smart diaper wetness detection solution.

Figure 12:
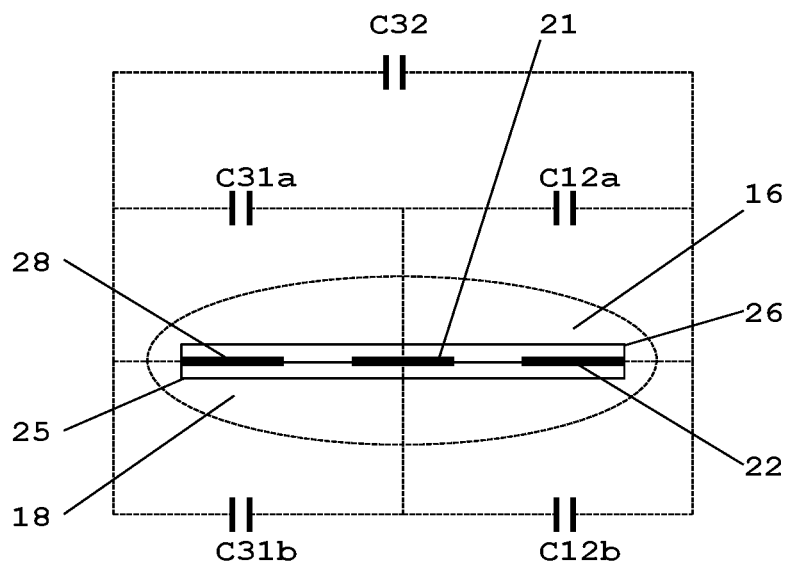
FIG. 12 is a schematic cross-sectional structure diagram and corresponding equivalent circuit diagram of a sensing strip including a third detection electrode according to an embodiment of the present invention.

FIG. 12 is a schematic cross-sectional structure diagram and corresponding equivalent circuit diagram of a sensing strip including a third detection electrode according to an embodiment of the present invention. Wherein 21 in the figure is the first detection electrode in the interlayer of the upper and lower waterproof films 26 and 25, which is completely in the sealed sensing layer, and does not have any exposed electrode part, and the second detection electrode 22 is mostly in the interlayer and is only exposed at the edge of the sensing strip through an interlayer slit/incision/slitting line, which are the same as the embodiment of FIG. 7, the difference is that in this embodiment of the present invention, a third detection electrode 28 is included, which is located on the other side of the first detection electrode 21, and like the second detection electrode, is also exposed at the edge of the sensing strip through an interlayer slit/incision/slitting line.

Although only one detection electrode is added in this embodiment of the present invention, it can provide more information related to the position and direction for the wet state detection of the sensing strip. Wherein the liquid 16 on the upper sensing surface can not only generate an electrolytic capacitor C12a between the first and second detection electrodes, but also generate an electrolytic capacitor C31a between the third and first detection electrodes; Similarly, the liquid 18 on the lower sensing surface can not only generate an electrolytic capacitor C12b between the first and second detection electrodes, but also generate an electrolytic capacitor C31b between the third and first detection electrodes. In addition, since a part of the third and second detection electrodes 28 and 22 is exposed to the outside through the interlayer slit/incision/slitting line and is in contact with the liquid to be detected, thus, an electric double layer capacitor C32 can be generated between the third and second detection electrodes.

Figure 13:
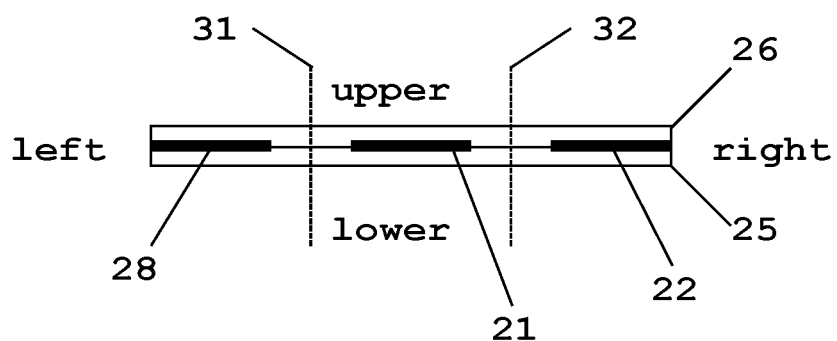
FIG. 13 is a schematic cross-sectional structure diagram and a position division diagram of up, down, left, and right when a sensing strip includes the third detection electrode according to an embodiment of the present invention.

FIG. 13 is a schematic cross-sectional structure diagram and a position division diagram of up, down, left, and right when a sensing strip includes a third detection electrode according to an embodiment of the present invention. To better illustrate the relationship between the liquid in various directions and the capacitance generated, the liquid around the sensing trip is divided into four areas: upper, lower, left and right. The left side of the dashed line 31 is the left area, and the right side of the dashed line 32 is the right area; the upper part between the dashed lines 31 and 32 is the upper area, and the lower part between the dashed lines 31 and 32 is the lower area. If there is liquid in the upper, lower, left, and right areas alone, no capacitance will be generated; but if there is liquid in the upper left, upper right, lower left and lower right, then four capacitors C31a, C12a, C31b, and C12b will be generated respectively; If there is liquid on the upper sensing surface (including left, upper and right), three capacitors C31a, C12a and C32 will be generated; If there is liquid on the lower sensing surface (including left, lower and right), three capacitors C31b, C12b and C32 will be generated. By detecting the capacitance between the first, second and third detection electrodes, the relevant liquid distribution can be known, or in other words, different liquid distributions will produce different capacitance distributions and the relevant signals can be weighted and output, the corresponding relationship is as follows:

| positions of the liquid present on the sensor strip | capacitance generated by the upper sensing surface between the first and second detection electrodes | capacitance generated by the lower sensing surface between the first and second detection electrodes | capacitance generated by the upper sensing surface between the first and third detection electrodes | capacitance generated by the lower sensing surface between the first and third detection electrodes | electric double layer capacitance generated between the second and third detection electrodes |
|---|---|---|---|---|---|
| upper left | | | √ | | |
| upper right | √ | | | | |
| lower left | | | | √ | |
| lower right | | √ | | | |
| upper, left and right | √ | | √ | | √ |
| lower, left and right | | √ | | √ | √ |
| upper, lower, and left | | | √ | √ | |
| upper, lower, and right | √ | √ | | | |
| upper, lower, left, and right | √ | √ | √ | √ | √ |

Figure 14:
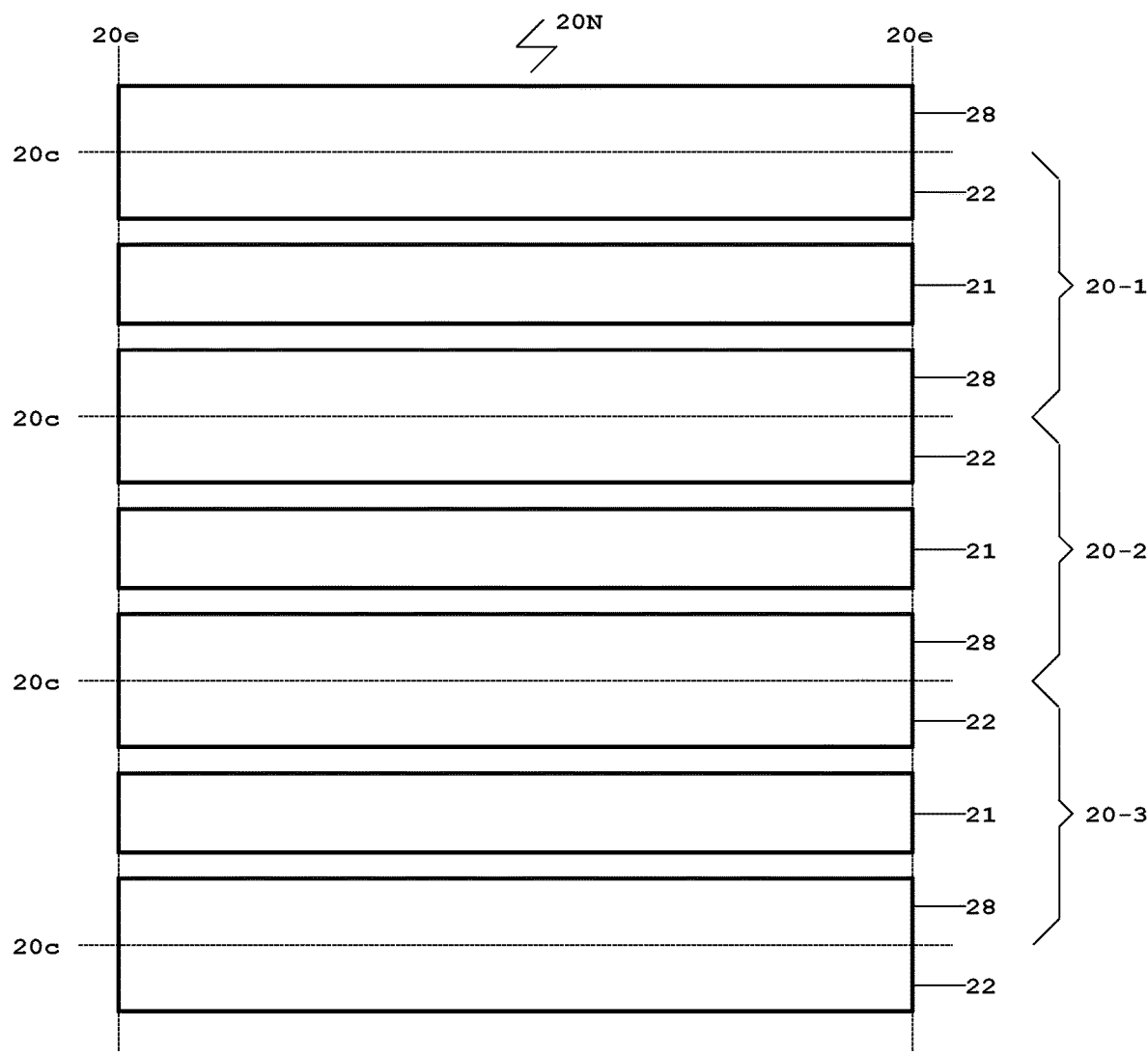
FIG. 14 is a schematic diagram of slitting sensing strips in the production process according to an embodiment of the present invention.

FIG. 14 is a schematic diagram of slitting sensing strips in the production process according to an embodiment of the present invention. To improve the production efficiency of the sensing strip, in practical applications, multiple sets of detection electrodes are usually printed on a large roll of a wide format waterproof film with a length of several kilometers, and the waterproof film printed with multiple sets of detection electrodes is then compounded with another wide format waterproof film to form a roll of wide format composite film, so that the multiple sets of detection electrodes are covered and protected by the upper and lower wide format waterproof films. To obtain a suitable sensing strip containing a set of detection electrodes, the above-mentioned wide format rolled composite film containing multiple sets of detection electrodes must be cut, a neat incision is produced by slitting, so that each of the second and third detection electrodes has one side exposed to the outside through the incisions of the slitting lines.

This embodiment takes the production of the sensing strip including three detection electrodes shown in FIG. 12 as an example for description. The 20N in this figure is part of a roll of composite film including multiple sets of detection electrodes (the actual length is much longer than that shown in the picture), where three groups of detection electrodes 20-1, 20-2, and 20-3 are included, each group of detection electrodes can form a sensing strip, so reference number 20-1, 20-2, and 20-3 can also be used to represent the three sensing strips. In practical applications, a wide format composite film may contain dozens or even hundreds of detection electrodes. Assuming that the length of the composite film is 3000 meters, and the width is 1 meter, and the width of the practical sensing strip is 2 cm, then a roll of wide format composite film can be cut into 50 rolls of narrow format sensing strip (rolled film materials) with a length of 3000 meters. The rolled narrow format sensing strip materials will then become a kind of raw materials for the production of smart diapers, during the production process, the narrow format rolled sensing strip materials are cut off and set on a specific layer of the diaper, or set the sensing strip on a specific layer of the diaper and then cut it together with the top layer, the absorbent layer and the leak-proof layer of the diaper to generate a smart diaper containing the sensing strip.

Each roll of the narrow format sensing strips in this embodiment includes three detection electrodes, which are the first, second and third detection electrodes 21, 22 and 28 respectively. 20c in this embodiment is a slitting line, after the slitting is performed at 20c, the second and third detection electrodes 22 and 28 that were originally connected has been cut apart. After the slitting, the second and third detection electrodes 22 and 28 located on the left and right sides of the sensing strip can be exposed to the outside through the incision of the slitting line 20c. As for the first detection electrode 21, it is located between the second and third detection electrodes 22 and 28 after slitting and is completely covered by the upper and lower waterproof films without any slitting line intersecting with it. In this embodiment, the slitting line 20c is arranged at the middle position of the detection electrodes of odd numbers (1, 3, 5, 7 . . . ) in parallel from top to bottom.

The narrow format rolled sensing strip material is cut to the desired length (usually the same length as the diaper) at 20e during the production of smart diapers. The composite film 20N in FIG. 14 can be used to make 3 pcs of sensing strips, and the excess parts above the sensing strip (20-1) and under the sensing strip (20-3) will be treated as waste. To produce more sensing strips at once, it is necessary to use a wider format waterproof film and print more sets of detection electrodes on the waterproof film.

Figure 15:
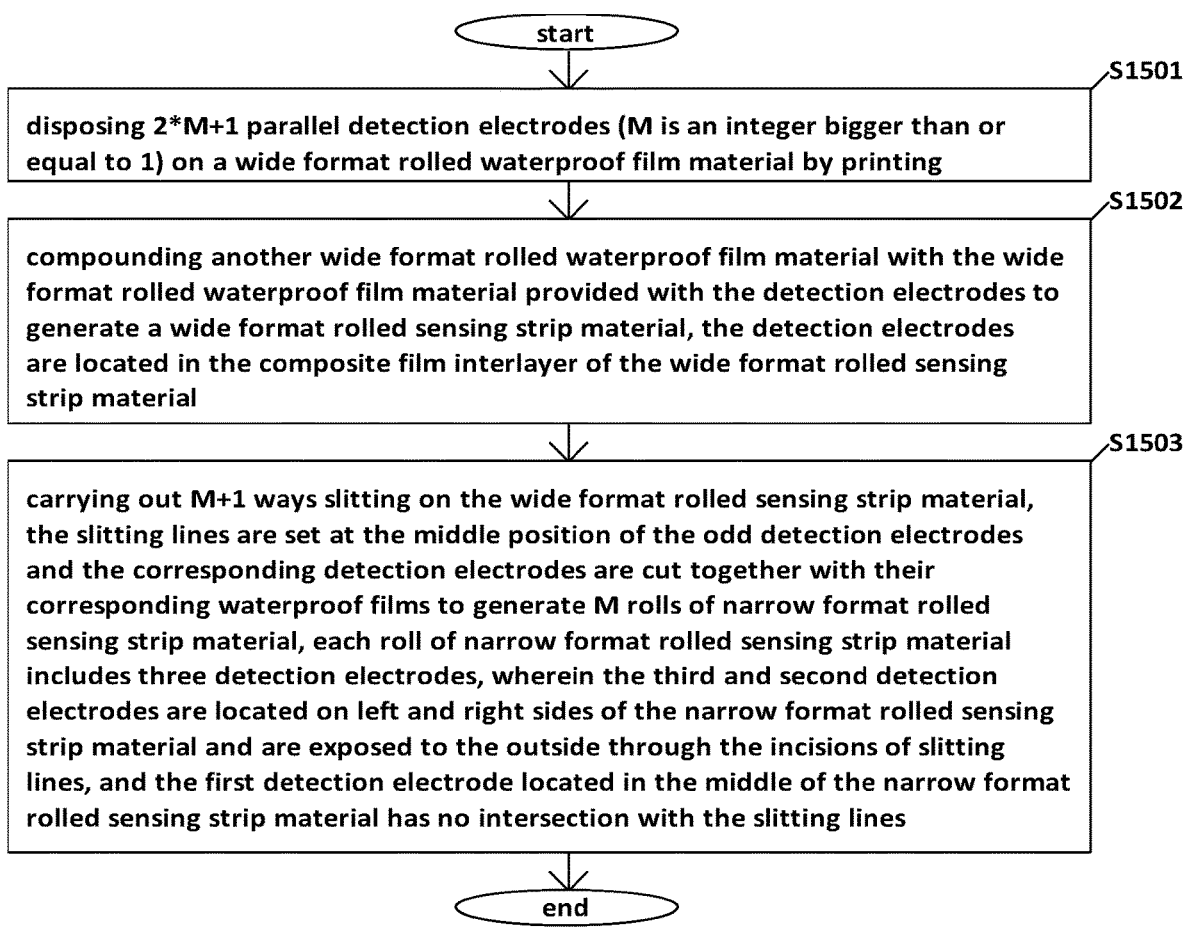
FIG. 15 is a flowchart of a manufacturing method for producing sensing strips according to the embodiment of the present invention shown in FIG. 12.

FIG. 15 is a flowchart of a manufacturing method for producing sensing strips according to the embodiment of the present invention shown in FIG. 12, including the following steps:

Step S1501 is disposing 2*M+1 parallel detection electrodes (M is an integer bigger than or equal to 1) on a wide format rolled waterproof film material by printing;

Step S1502 is compounding another wide format rolled waterproof film material with the wide format rolled waterproof film material provided with the detection electrodes to generate a wide format rolled sensing strip material, the detection electrodes are located in the composite film interlayer of the wide format rolled sensing strip material;

Step S1503 is slitting the wide format rolled sensing strip material into M+1 paths, the slitting lines are set at the middle position of the odd detection electrodes and the corresponding detection electrodes are cut together with their corresponding waterproof films to generate M rolls of narrow format rolled sensing strip material, each roll of narrow format rolled sensing strip material includes three detection electrodes, wherein the third and second detection electrodes are located on left and right sides of the narrow format rolled sensing strip material and are exposed to the outside through the incisions of slitting lines, and the first detection electrode located in the middle of the narrow format rolled sensing strip material has no intersection with the slitting lines.

The narrow format rolled sensing strip material is a kind of narrow-width roll-shaped material produced by winding. Rolled material is a packaging method, in practical applications, sensing strip with a length of several kilometers can also be packaged in other ways, for example, they can be folded to form stacks of sensing strip. For convenience of expression, the rolls or stacks of narrow format sensing strip materials may be collectively referred to as sensing strip materials, which are one of the raw materials required for producing the disposable smart absorbent article of the embodiment of the present invention. At the same time, the sensing strips that can be used to produce multiple disposable smart absorbent articles packaged in any other way can be called sensing strip materials, as long as the sensing strip material is cut to a desired length during the production process, a sensing strip of suitable length can be produced. That is to say, the sensing strip material is the same in structure as the sensing strip, except for the length.

The sensing strip material of this embodiment includes the structure of three detection electrodes as shown in FIG. 12, in practical applications, the sensing strips of the structures related to FIGS. 1 to 11 can also be made into long sensing strips packaged in rolls or stacks, it can also be one of the production materials required for the disposable smart absorbent article of the embodiment of the present invention. In the diaper production process, the sensing strip material is cut to a desired length to produce a sensing strip as shown in FIGS. 1 to 11. Since the sensing strip is cut from the sensing strip material, in most cases the sensing strip and the sensing strip material are mainly different in length, as for other physical properties are the same, the technical characteristics of the sensing strip are also present in the sensing strip material.

Figure 16:
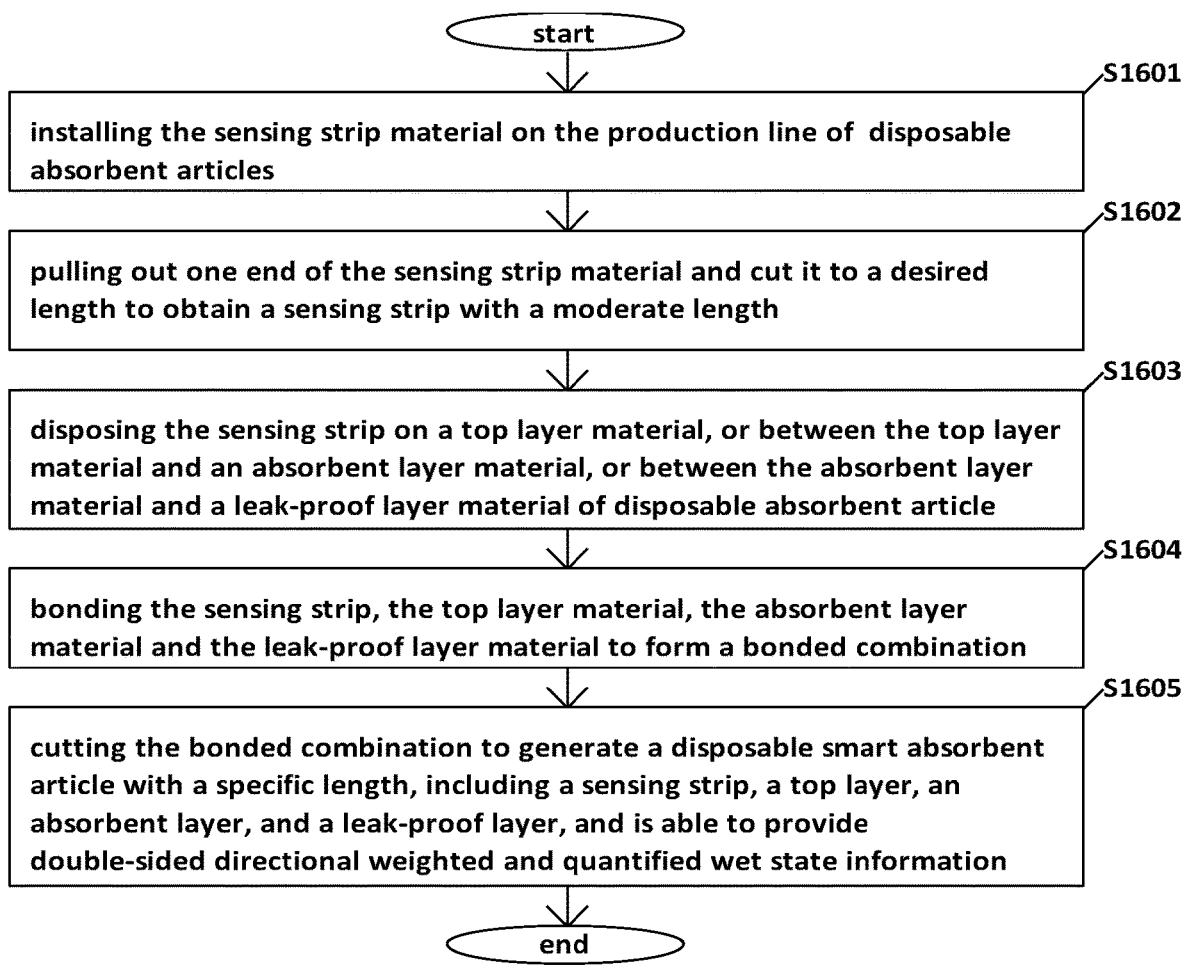
FIG. 16 is a flow chart of a manufacturing method for producing disposable smart absorbent articles that include a sensing strip and can provide double-sided directional weighted and quantified wet state information according to an embodiment of the present invention.

FIG. 16 is a flow chart of a manufacturing method for producing disposable smart absorbent articles that include a sensing strip and is able to provide double-sided directional weighted and quantified wet state information according to an embodiment of the present invention, including the following steps:

Step S1601 is installing the sensing strip material on the production line of disposable absorbent articles;

Step S1602 is pulling out one end of the sensing strip material and cut it to a desired length to obtain a sensing strip with a moderate length;

Step S1603 is disposing the sensing strip on a top layer material, or between the top layer material and an absorbent layer material, or between the absorbent layer material and a leak-proof layer material of disposable absorbent article;

Step S1604 is bonding the sensing strip, the top layer material, the absorbent layer material and the leak-proof layer material to form a bonded combination;

Step S1605 is cutting the bonded combination to generate a disposable smart absorbent article with a specific length, including a sensing strip, a top layer, an absorbent layer, and a leak-proof layer, and is able to provide double-sided directional weighted and quantified wet state information.

Figure 17:
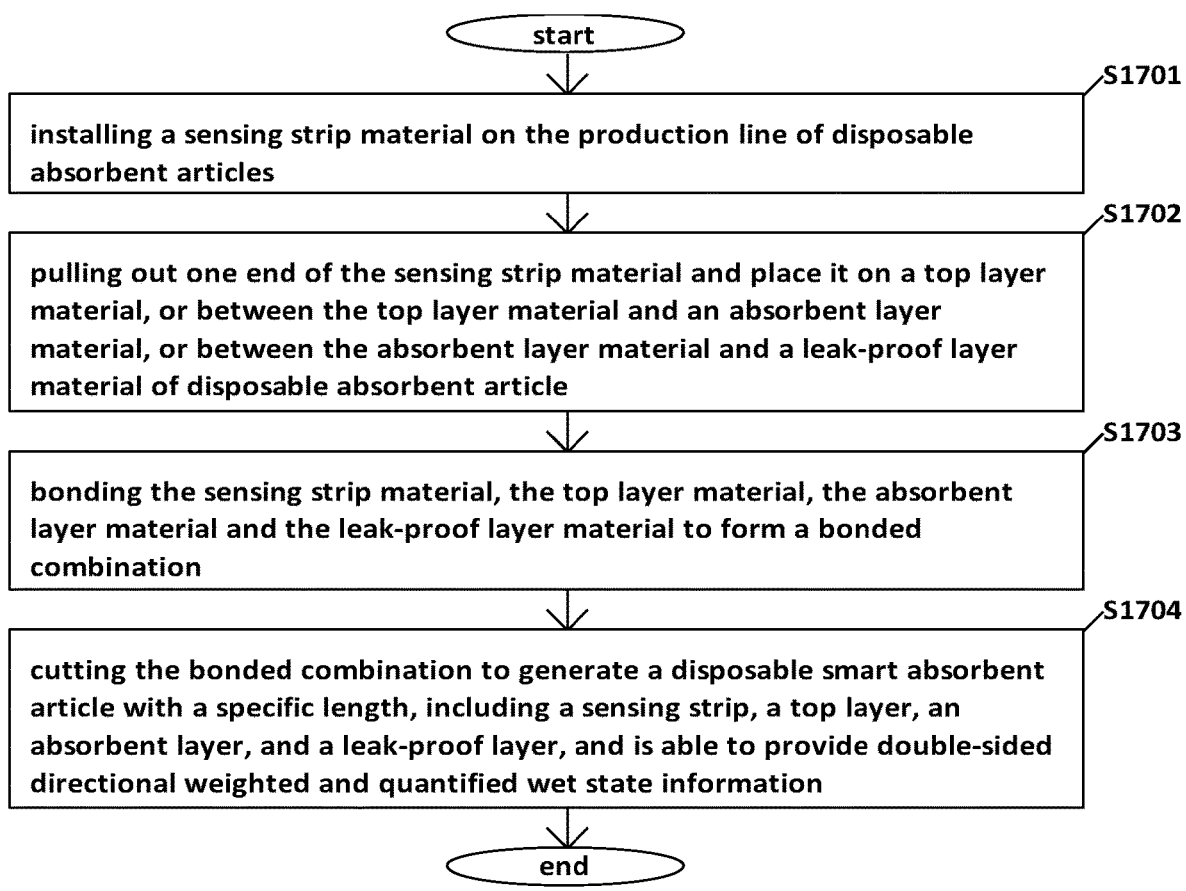
FIG. 17 is another flow chart of a manufacturing method for producing disposable smart absorbent articles that include a sensing strip and can provide double-sided directional weighted and quantified wet state information according to an embodiment of the present invention.

FIG. 17 is another flow chart of a manufacturing method for producing disposable smart absorbent articles that include a sensing strip and can provide double-sided directional weighted and quantified wet state information according to an embodiment of the present invention.

Step S1701 is installing a sensing strip material on the production line of disposable absorbent articles;

Step S1702 is pulling out one end of the sensing strip material and place it on a top layer material, or between the top layer material and an absorbent layer material, or between the absorbent layer material and a leak-proof layer material of disposable absorbent article;

Step S1703 is bonding the sensing strip material, the top layer material, the absorbent layer material and the leak-proof layer material to form a bonded combination;

Step S1704 is cutting the bonded combination to generate a disposable smart absorbent article with a specific length, including a sensing strip, a top layer, an absorbent layer, and a leak-proof layer, and is able to provide double-sided directional weighted and quantified wet state information.

In the production of disposable absorbent articles, rolls of hydrophilic non-woven fabrics are usually used for the top layer materials; rolls of polyethylene films are usually used for the leak-proof layer materials, and the absorbent layer material is usually formed by wrapping the absorbent core with non-woven fabrics. All these materials generally need to be bonded to form a bonded combination, and then the bonded combination is cut through a cutting process to generate the disposable absorbent articles one by one that can be used independently.

The above flow of method is a conventional operation flow, in practical applications, depending on different situations, there may be different sequences, and there will also be some operational changes, these equivalent variations on a general concept are still covered by the present invention.

In the embodiments of the present invention, the sensing strips are usually produced by the cutting process of the sensing strip material, and its length is determined according to the specifications of the disposable absorbent article, generally between 20 cm and 1 m; the width of the sensing strip materials are generally between 1 cm and 10 cm, preferably 1 to 3 cm; the length is between 100 meters and 10,000 meters, preferably 1 to 5 kilometers; the thickness is between 10 microns and 1 mm, preferably 10 to 50 microns; the roll diameter (outer diameter after winding) is between 10 cm and 1 m, preferably 20 to 60 cm.

The above disclosures are only preferred embodiments of the present invention, and of course, the scope of the rights of the present invention cannot be limited by this. Therefore, equivalent changes made according to the claims of the present invention are still within the scope of the present invention.

What is the claimed is:

1. A sensor for realizing double-sided directional weighted and quantified wet state detection, comprising a sensing strip, which comprises an upper sensing surface and a lower sensing surface, adapted to realize the quantified wet state detection for the upper and lower sides respectively, and the wet state of the upper and lower surfaces can be weighted and output according to a preset specific gravity, thereby a weighted and quantified wet state information related to a specific layer and a specific direction of a specific detection object is provided, wherein the sensing strip comprises an upper waterproof film corresponding to the upper sensing surface and a lower waterproof film corresponding to the lower sensing surface, a sensing layer is comprised between the upper and lower waterproof films, and the sensing layer is covered by the upper and lower waterproof films, and the sensing strip comprises a first detection electrode and a second detection electrode, and the first and second detection electrodes are disposed in the sensing layer, wherein the first detection electrode is completely covered by the upper and lower waterproof films and has no contact with liquid to be detected during operation, and at least a part of the second detection electrode is exposed to the outside through an interlayer edge of the upper and lower waterproof films or incision or slit provided on the waterproof film and contacts the liquid to be detected containing electrolyte, the liquid to be detected is made equipotential with it to form a liquid electrode.

2. The sensor according to claim 1, wherein the sensing strip further comprises a third detection electrode disposed in the sensing layer, wherein the first, second and third detection electrodes are disposed in parallel and extend along the length direction of the sensing strip, the first detection electrode is located at the center of the sensing layer, and the second and third detection electrodes are respectively located on the left and right sides of the first detection electrode, and are exposed to the outside through slitting incisions at the edges of the sensing strip; and when the sensing strip is soaked by the liquid to be detected containing electrolyte, an electrolytic capacitor will be produced between the first and second detection electrodes, and between the first and third detection electrodes respectively, and the capacitance of the electrolytic capacitors is positively related to the area of the liquid to be detected on the upper and lower waterproof films corresponding to the first detection electrode; and an electric double layer capacitor will be produced between the second and third detection electrodes, and the capacitance value of the electric double layer capacitor is positively related to the area of the liquid to be detected infiltrating the second and third detection electrodes at the incisions.

3. The sensor according to claim 2, wherein the combination of the first, second and third detection electrodes can not only provide the directional weighted and quantified wet state detection capability of the upper and lower sides, but also provide the weighted and quantified wet state detection capability in four directions: upper left, lower left, upper right, and lower right.

4. The sensor according to claim 1, wherein the sensing strip has a soft ribbon-like structure, and its cross-section at any position in the length direction is equal, so that it is suitable to produce disposable absorbent articles of different lengths, as long as the sensing strip is cut off according to the length of the disposable absorbent article and placed on a specific layer of the disposable absorbent article.

5. The sensor according to claim 1, wherein the waterproof film comprises a rigid plastic film, the rigid plastic film comprises a BOPP film or a PET film, and the detection electrodes comprise conductive ink printed lines, the conductive ink printed lines comprise carbon ink printed lines.

6. A disposable smart absorbent article capable of providing double-sided directional weighted and quantified wet state information comprising a top layer, an absorbent layer, an anti-leakage layer, and the sensor according to claim 1, the sensor is disposed on the top layer, or between the top layer and the absorbent layer, or between the absorbent layer and the leak-proof layer, and realizes the double-sided directional weighted and quantified wet state detection function, the absorbent layer comprises polymer absorption material, the top layer comprises a hydrophilic non-woven fabric, and the leak-proof layer comprises a breathable or non-breathable polyethylene film.

7. The sensor according to claim 1, wherein when the liquid to be detected accumulates on the upper and lower sensing surfaces, the first detection electrode, the second detection electrode and the upper waterproof film, the lower waterproof film and the liquid to be detected together form an electrolytic capacitor, the first and second detection electrodes constitute the pole plates of the electrolytic capacitor, the liquid to be detected constitutes the electrolyte or liquid electrode of the electrolytic capacitor, the waterproof films constitutes the dielectric of the electrolytic capacitor, the capacitance of the electrolytic capacitor is proportional to the area of the liquid to be detected on the sensing surface corresponding to the first detection electrode, and the detection sensitivity of the upper and lower sensing surfaces is proportional to the dielectric constant of the upper and lower waterproof films, and inversely proportional to the thickness of the upper and lower waterproof films, the weights of the wet state of the upper and lower sensing surfaces are proportional to the detection sensitivity of the upper and lower sensing surfaces.

* * * * *